H. DOLLMAN.
LOCK NUT.
APPLICATION FILED OCT. 31, 1913.

1,113,419.

Patented Oct. 13, 1914.

Witnesses:
John C. Sanders
Albert F. Heuman

Inventor
Hubert Dollman
By Wm Wallace White
atty

UNITED STATES PATENT OFFICE.

HUBERT DOLLMAN, OF BIRMINGHAM, ENGLAND.

LOCK-NUT.

1,113,419. Specification of Letters Patent. Patented Oct. 13, 1914.

Application filed October 31, 1913. Serial No. 798,438.

*To all whom it may concern:*

Be it known that I, HUBERT DOLLMAN, of Baskerville Place, Broad street, in the city of Birmingham, England, retired mechanical engineer, a subject of His Majesty the King of Great Britain and Ireland, have invented new and useful Improvements in Lock-Nuts, of which the following is a specification.

This invention comprises an improved lock-nut which is so constructed as to be effectually prevented from turning back under the influence of vibration.

My improved lock nut can be effectively employed with an ordinary threaded bolt, and is so constructed that the locking piece of the nut is wholly disposed within the periphery of the body of the nut, so that it cannot be acted upon by the spanner or wrench.

According to this invention the outer portion of the nut is formed as a pair of spring tongues having their free ends adjacent and pointing toward each other, said tongues being adapted to act radially or thereabout to the nut axis and grip the bolt when the nut is screwed thereon, said tongues being so located on the nut that they are not affected by the application of a spanner thereto. By preference the nut is made of steel and the spring tongues are hardened and tempered, although they may be left unhardened.

Figure 1:
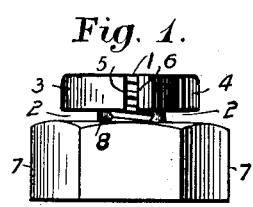
Figure 3:
Figure 2:
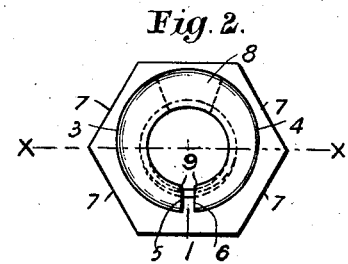
Figure 4:
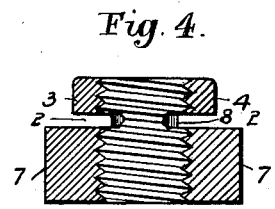

Of the accompanying drawings, Figure 1 is a front elevation of a hexagonal nut constructed in accordance with this invention; Fig. 2 is a plan of the same; Fig. 3 is a side elevation of the same, and Fig. 4 is a sectional front elevation on line X—X of Fig. 2.

My invention is applicable to all kinds of lock-nuts whether of round, square, hexagonal, octagonal or other shape.

In carrying out my invention the nut blank is formed with an eccentric circular pommel projecting from its outer face and before or after the nut has been tapped through this pommel the latter is divided at its thinnest part by a cross saw-cut 1 extending from the top of the pommel down to the face of the nut and then this pommel is almost separated from the face of the nut by a horizontal saw-cut or division 2 taken at right angles to the axis of the nut and on the face of the nut thus forming the pommel into two spring tongues marked respectively 3, 4 which are connected to the nut proper by the solid part 8 which has not been removed by the horizontal saw-cut. Owing to the pommel being eccentric the spring tongues 3, 4 taper from their root part 8 to their free ends 5, 6. These free ends 5, 6 of the two tongues 3, 4 are pressed slightly inwardly so that the internal diameter of the bolt hole between the spring tongues is smaller than the internal diameter of the bolt hole in the body portion of the nut by an amount sufficient to cause each tongue to exert a gripping pressure on the bolt when the nut is screwed thereon, the sharp angular corners 9 of the free ends 5, 6 of the tongues 3, 4 being by preference taken off to prevent them from injuring the threads of the bolt. The tongues 3, 4 are or may be conveniently hardened and tempered to the required degree so that they have a permanent resiliency and act in a similar way to a spring and thereby increase the useful life of the lock nut. The said tongues may however be left soft or unhardened. When the lock-nut is screwed on to the bolt the inner surface of the end portions 5, 6 of the tongues 3, 4 grip the bolt sufficiently to properly lock the nut on the bolt and prevent it from turning back through vibrations.

It will be seen that with the construction of lock-nut above described the application of a spanner thereto for the purpose of turning it does not damage the spring tongues 3, 4 owing to their being nearer to the nut axis than are the faces 7 of the body of the nut which are engaged by the spanner.

What I claim as my invention and desire to secure by Letters Patent is:—

A lock nut having a thread formed therein and consisting of a body portion and a locking piece comprising two arc shaped spring tongues eccentrically disposed to the axis of the nut and extending around more than three fourths of the circumference of the bolt hole, said tongues being connected to said body portion at one part only, said tongues being integral with the body portion and with each other and formed by two right angle saw cuts, said locking piece being disposed wholly within the periphery of said body portion, the thread in said body portion being of uniform diameter throughout, and the thread in said locking piece being of uniform diameter throughout and being of less diameter than the thread in said body portion.

In testimony whereof I have signed my name to this specification in the presence of two subscribing witnesses.

HUBERT DOLLMAN.

Witnesses:
CHARLES BOSWORTH KETLEY,
ELIZABETH MAY DUDLEY.